Sept. 27, 1966          G. S. MILL          3,275,704
IODINE RECOVERY FROM ORGANIC IODIDES
Filed July 16, 1964
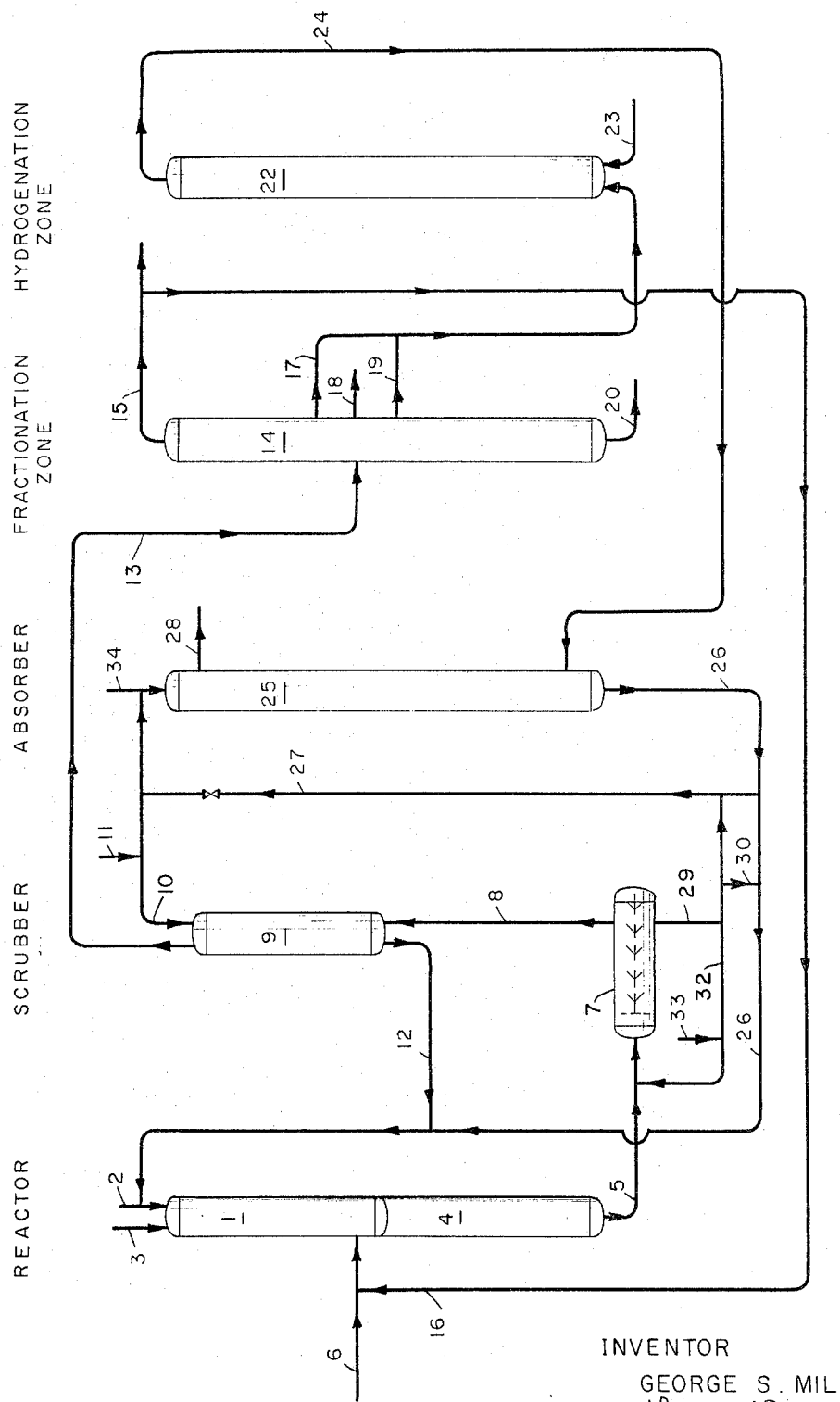
INVENTOR
GEORGE S. MILL
BY Thomas Donegal Jr.
HIS ATTORNEY 3,275,704
IODINE RECOVERY FROM ORGANIC IODIDES
George Stewart Mill, Pasadena, Tex., assignor to Shell Oil Company, New York, N.Y., a corporation of Delaware
Filed July 16, 1964, Ser. No. 383,087
3 Claims. (Cl. 260—673)

This invention relates to a process for the dehydrogenation of organic compounds. More particularly, it relates to an improved process for the recovery of iodine from the organic iodides produced as by-products is iodinative dehydrogenation operations.

British Patent 895,500 discloses the use of certain metal oxides as HI acceptors in the reaction of iodine with organic compounds. Maxwell Nager, in U.S. 3,080,435, proposes to dehydrogenate organic compounds by a process involving: (1) iodinative dehydrogenation of an organic compound by reaction with elemental iodine in a molten metal iodide environment to produce a dehydrogenated compound and hydrogen iodide, (2) immediately producing a metal iodide by reaction of the produced hydrogen iodide with the corresponding metal oxide or hydroxide in the dehydrogenation zone, and (3) regenerating elemental iodine from the metal iodide, either in the dehydrogenation zone or in a separate oxidation zone, by reaction with oxygen under conditions under which the metal iodide is in a molten state. Such iodinative dehydrogenative processes often have the disadvantage of producing in addition to hydrogen iodide, various organic iodides which do not react with metal oxides. These undesirable iodine-containing compounds not only decrease the efficiency of the dehydrogenation by remaining in the combined form, but also contribute to the cost of the process by the resultant loss of iodine in the waste gases.

It is, therefore, a principal object of this invention to provide an improved process for the recovery of iodine from byproduct organic iodides formed during an iodinative dehydrogenation process.

Other objects will be apparent and the objects better understood from the description of the invention which follows and by reference to the accompanying drawing wherein:

The single figure is a simplified flow diagram illustrating a preferred mode of practicing the invention.

In accordance with the present invention, it has been found that the recovery of iodine from organic iodides can be accomplished, thereby reducing the loss of iodine, by subjecting the product distillate fractions containing the organic iodides to catalytic hydrogenation with subsequent absorption of the hydrogen iodide produced in the hydrogenation reaction in a lithium hydroxide/lithium iodide solution. The solution can then be returned to the iodinative dehydrogenation reactor for further reaction.

It has been found that the organic iodides can be separated from the effluent stream by fractional distillation, i.e., separation of various components through differences in boiling point, in two fractions which contain substantially all of the organic iodides present.

This invention is applicable to iodinative dehydrogenation of various compounds. However, for the sake of brevity and specificity, the invention will be described in further detail in connection with the production of aromatic hydrocarbons, particularly para-xylene, by iodinative dehydro-coupling and cyclizing of lower aliphatic hydrocarbons, e.g., isobutane/isobutene, in the presence of molten LiI/LiOH, with regeneration of iodine from LiI by reaction with oxygen as more fully disclosed in copending U.S. application Serial No. 252,051, filed January 17, 1963, now U.S. Patent 3,168,584, issued February 2, 1965

Referring to the single figure, the shown embodiment is a system in which the gaseous substances and molten salts move in co-current flow in the reactors and the dehydrogenation and the regeneration reactions take place in downflow. In the drawing, regeneration zone 1 has a molten metal salt inlet line 2 and an oxygen-containing gas inlet line 3 entering at the top thereof. The reactants pass from regeneration zone 1 into dehydrogenation zone 4, wherein the hydrocarbon to be dehydrogenated is introduced through inlet line 6 so that the dehydrogenation occurs in the zone 4. The effluent stream from 4 passes via line 5 to separator 7 from which the organic materials are removed through line 8 to scrubber 9 wherein any entrained HI in the gaseous product is removed by a scrubbing solution of lithium hydroxide-lithium iodide introduced via line 10. Additional water may be added through line 11. The scrubbing solution, enriched with entrained HI from the gaseous product is recycled via line 12 and line 26 to line 2 into regeneration zone 1. The scrubbed product stream passes through line 13 to the fractionation zone 14. From the distillation in zone 14, the light hydrocarbon materials are returned via line 15, line 16 and line 6 to the dehydrogenation zone 4. The cut containing the light organic iodides is removed through line 17 and passes to the hydrogenation zone 22. A product stream is withdrawn through line 18. Heavy organic iodides are withdrawn through line 19 and passed, in combination with the lighter organic iodides, into hydrogenation zone 22. Heavy ends (including polymers) are removed through line 20. Hydrogen is introduced into the hydrogenation zone through line 23 and the product of the hydrogenation is removed through line 24 to absorber 25 wherein the hydrogen iodide is absorbed in a lithium hydroxide/lithium iodide scrubbing solution. The HI enriched solution is removed via line 26 and either returned to the regeneration zone via line 2, or recycled to the absorber 25 via line 27. Line 10 described, infra, diverts part of the recycle stream in line 27 to the scrubber 9. The hydrocarbon materials are removed via line 28. Makeup lithium hydroxide/lithium iodide solution is introduced from separator 7 into absorber 25 via lines 29 and 27 and into the returning hydrogen iodide enriched lithium hydroxide/lithium iodide stream from the absorber 25 via line 26. The lithium hydroxide/lithium iodide stream can also be partially recycled to the separator 7 via lines 29, 32 and 5. Additional water may be added to the recycle stream in line 32 via line 33. Furthermore, the lithium hydroxide/lithium iodide stream can be returned to the regeneration zone 1 via lines 29, 30, 26 and 2. If additional water is desired in the enriched hydrogen iodide stream, it may be introduced through line 34 into absorber 25.

Details as to relative sizes, shapes and placement of the pieces of equipment and provision for gas compressors, valves, baffles, fluid seals, condensers, heaters, and the like are omitted for clarity since they will be readily supplied by those skilled in the relevant art.

It has been found to be advantageous to scrub the product stream with a lithium hydroxide solution while still under pressure; at atmospheric pressure, a fogging occurs which interferes with the scrubbing operation. Additional advantages inherent in the use of a pressurized scrubber include a rapid and clean separation, absence of emulsion problems and less exposure of the scrubbing apparatus to the corrosive gaseous hydrogen iodide. The amount of pressure is not critical, but pressures to 250 p.s.i. have proved beneficial.

After the product stream has been treated in scrubber 9, it is substantially free of hydrogen iodide and then passed to a fractionation zone. The fractionation is performed in a conventional manner with a light hydrocarbon cut removed overhead and returned to the dehydrogenation zone of the reactor through the hydrocarbon feed line 15. The light hydrocarbon stream passing overhead contains everything up to and including isobutylene. The next fraction removed most advantageously contains all the materials boiling between isobutylene and para-xylene, including methyl and the $C_2$–$C_3$ and $C_4$ vinylic iodides which contain about 30–80% by weight of the iodine present in the system. The third cut contains the para-xylene product. The fourth cut contains all the material boiling between para-xylene and 2,7-dimethylnaphthalene and includes the $C_6$–$C_8$ aromatic iodides, which contains about 10–30% by weight of the iodine in the system.

The two cuts containing the organic iodides are then passed under superatmospheric pressure to the hydrogenation unit wherein the organic iodides are catalytically converted to hydrocarbons and hydrogen iodide. The iodides are vaporized by injection into a large excess of superheated hydrogen. This mixture passes as a vapor at an elevated temperature and pressure over a suitable hydrogenation catalyst. The two organic iodide cuts, i.e., light and heavy, may be hydrogenated separately, or either one or both streams can be catalytically hydrogenated to recover the iodine for return to the system. It is preferred to hydrogenate the combination of the two streams, since the vinylic iodides are diluted, i.e., polymerization is reduced by the presence of some aromatic iodides. Of course the optimum conditions of hydrogenation will vary, depending on what part of the organic iodides is being treated, i.e., the lighter iodides being treated at lower temperatures, due to thermal instability of the vinylic iodides.

The hydrogenation catalyst can be a metal of Group VIII–B of the Periodic Table, with palladium, platinum and rhodium being the more preferred. The hydrogenation catalyst is preferably retained on an essentially inert, neutral carrier material such as alumina, silica or carbon.

The hydrogenation is preferably carried out at a pressure from 100–2000 p.s.i. and preferably in the range of 200–500 p.s.i. The temperature may be satisfactorily maintained between 500° F. and 1000° F. with 600° F.–800° F. being preferred. Temperatures below 500° F. result in incomplete reduction of the organic iodides. The liquid hourly space velocity (LHSV), a convenient measurement of the amount of material treated/unit of catalyst, is most advantageously maintained between 0.1 and 5.0 with the preferred range being 0.3–2.0. The preferred type of catalyst is limited to one that will not react with the hydrogen iodide when formed. Catalysts containing cobalt or nickel oxides are also unsuitable for this reaction, because on regeneration (air burn-off), the nickel and cobalt iodides decompose to give elemental iodine (and the original oxide) which is difficult to handle in the hydrogenation zone.

The hot product stream containing the resulting hydrogen iodide and hydrocarbons under pressure in contacted under continued pressure with a hot lithium hydroxide/lithium iodide scrubbing solution wherein the hydrogen iodide is absorbed by the solution. Herein the pressure is maintained in a range substantially the same so that which was present in the hydrogenation unit. The scrubber solution to which can be added additional water for purposes of dilution is returned to the oxidative regeneration zone.

The following specific examples of the invention will serve to illustrate more clearly the application of the invention, but is not to be construed as in any manner limiting the invention.

Example I

A feed stock containing 15.1% by weight of iodine in the form of organic iodides, obtained by combining two of the distillation cuts from a para-xylene liquid effluent stream obtained in the iodinative dehydrogenation of isobutane/isobutene was introduced into the hydrogenation unit. The first of the two fractions contained all of the material boiling between isobutylene and para-xylene and included methyl and $C_2$, $C_3$ and $C_4$ vinylic iodides while the second cut contained all the material boiling between para-xylene and 2,7-dimethylnaphthalene and included the $C_6$–$C_8$ aromatic iodides, the two fractions together accounting for about 98% by weight of the total iodine in organic iodide passing out with the product streams from the dehydrogenation unit. The catalyst was a 1% by weight palladium mounted on alumina and having a surface area of 189 meters$^2$/gram, pore volume of 0.84 cubic centimeter/gram and bulk density of 0.52 gram/cubic centimeters and in the shape of $\frac{1}{10}$ inch spheres. The hydrogenation was carried out at 500 p.s.i., 550° F. and 0.5 LHSV. The organic iodide content of the effluent was reduced to 0.05–0.15% w., all present in the form of methyl iodide. The effluent stream was then passed through a scrubbing solution of lithium hydroxide/lithium iodide, obtained by adding a small amount of water to a portion of the molten LiOH/LiI from the dehydrogenation zone, with absorption and reaction of the hydrogen iodide with the lithium hydroxide. This aqueous solution was returned to the regeneration zone. By this return of the aqueous portion, water was also introduced, whereby the formation of lithium periodate was inhibited in the regeneration zone. A weight-balance indicated that about 98% of the iodine was recovered.

Example II

A feed stock containing 7.3% by weight iodine in the form of organic iodides, obtained as in Example I was subjected to hydrogenation over a catalyst of 0.78% by weight of platinum on $\frac{1}{10}$ inch alumina spheres at 200 p.s.i.g., 700° F. and 1.0 LHSV. The organic iodide content of the effluent was reduced to less than 0.2% w.

Example III

A feed stock, similar to that of Example II, was subjected to hydrogenation over a catalyst of 0.5% by weight of palladium on $\frac{1}{10}$ inch alumina spheres at 250 p.s.i.g., 750° F. and 1.0 LHSV. The organic iodine content of the effluent was reduced to less than 0.2% w.

Example IV

A feed stock, similar to that of Example II, was subjected to hydrogenation over a catalyst of 0.5% by weight palladium on $\frac{1}{4}$ inch diameter by $\frac{1}{4}$ inch length alumina cylinders at 500 p.s.i.g., 550° F. and 0.5 LHSV. The organic iodide content of the effluent was reduced to less than 0.3% w.

Example V

A feed stock, similar to that of Example II, was subjected to hydrogenation over a catalyst of 1.5% by weight palladium on $\frac{1}{10}$ inch alumina spheres at 250 p.s.i.g., 750° F. and 0.5 LHSV. The organic iodide content of the effluent was reduced to less than 0.04% w.

I claim as my invention:

1. In a process for the iodinative dehydrogenation of a first hydrocarbon to at least a second hydrocarbon having a higher carbon-to-hydrogen ratio, wherein the first hydrocarbon and a reactive iodine species are reacted at a temperature in excess of 200° C. in an environment of a metallic base and corresponding metal iodide, whereby a second hydrocarbon and hydrogen iodide are produced, the improvement comprising the recovery of the iodine from resulting organic iodide formed in the reaction zone by (1) fractionally distilling separated organic product stream containing organic iodide and second hydrocarbon;
(2) catalytically hydrogenating separated fractional cuts containing organic iodides and substantially free from second hydrocarbon under pressure to convert the organic iodides to hydrocarbons and hydrogen iodide;
(3) passing the resulting hydrogenated stream through aqueous lithium hydroxide/lithium iodide solution under pressure and at an elevated temperature to absorb the hydrogen iodide; and
(4) returning the resulting aqueous stream to the iodinative dehydrogenation operation.

2. A process in accordance with claim 1 wherein the environment is in a molten state.

3. A process in accordance with claim 1 wherein the environment is molten lithium hydroxide/lithium iodide.

References Cited by the Examiner

UNITED STATES PATENTS

| | | | |
|---|---|---|---|
| 3,080,435 | 3/1963 | Nager | 260—683.3 |
| 3,106,590 | 10/1963 | Bittner | 260—683.3 |
| 3,168,584 | 2/1965 | Nager | 260—673 |
| 3,207,808 | 9/1965 | Bajars | 260—683.3 |

DELBERT E. GANTZ, *Primary Examiner.*

G. E. SCHMITKONS, *Assistant Examiner.*